2 Sheets—Sheet 1.
M. NOLDEN.
WATER PURIFYING APPARATUS.
No. 181,468. Patented Aug. 22, 1876.
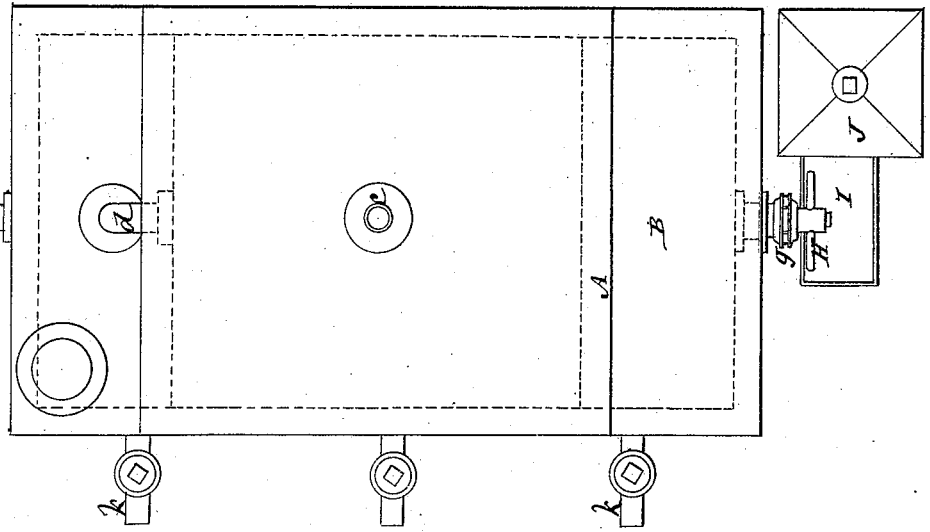
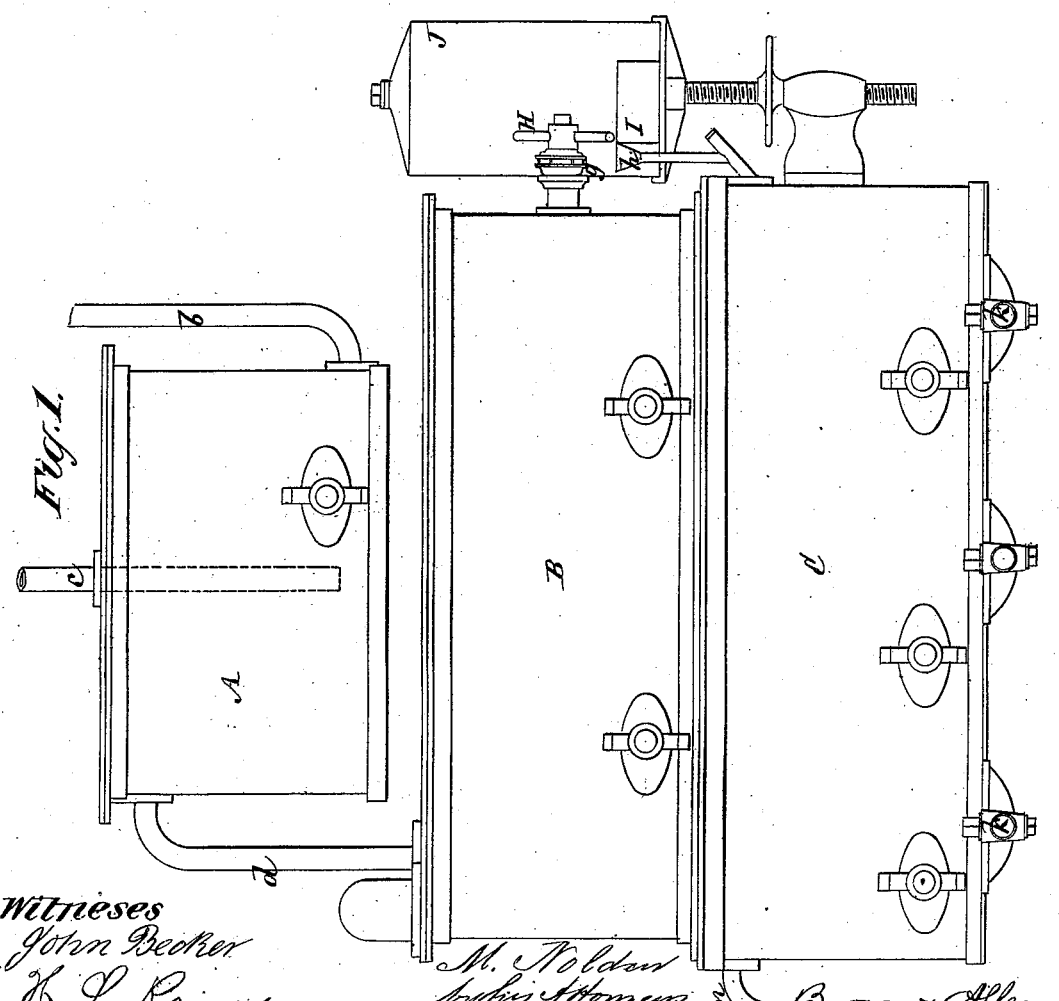
Witnesses
John Becker
H. L. Rainey
M. Nolden
by his Attorneys
Brown & Allen 2 Sheets—Sheet 2.
M. NOLDEN.
WATER PURIFYING APPARATUS.
No. 181,468. Patented Aug. 22, 1876.
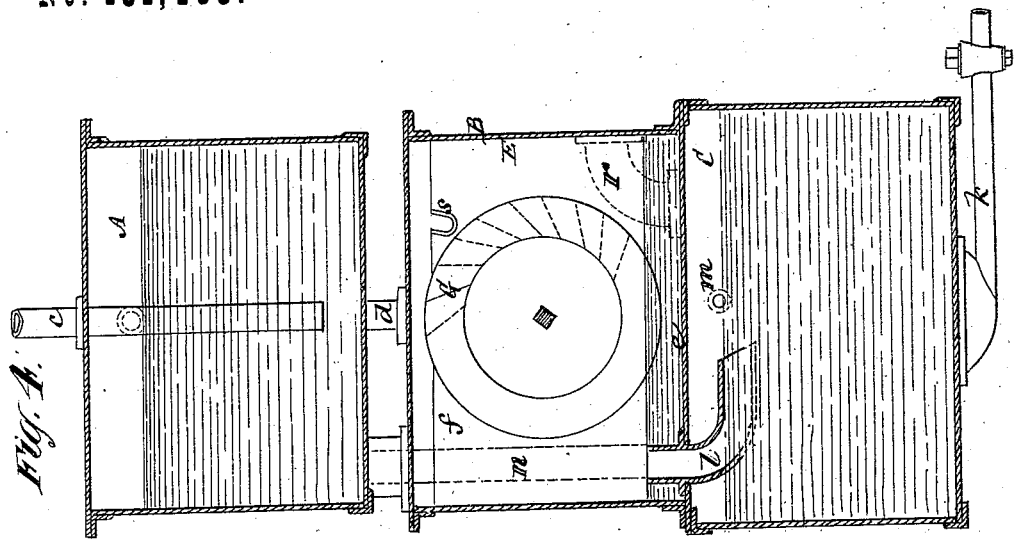
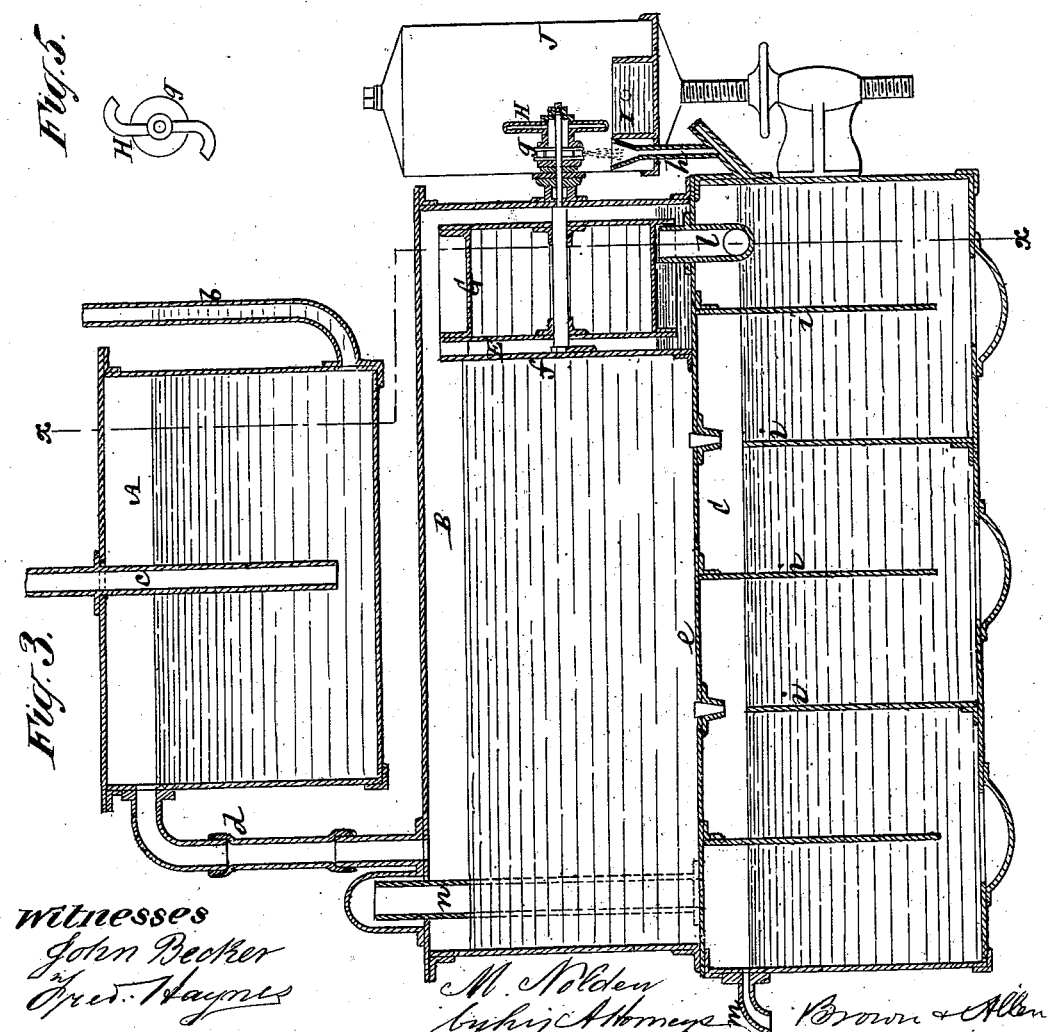
witnesses

UNITED STATES PATENT OFFICE.

MELCHIOR NOLDEN, OF FRANKFORT-ON-THE-MAIN, GERMANY.

IMPROVEMENT IN WATER-PURIFYING APPARATUS.

Specification forming part of Letters Patent No. 181,468, dated August 22, 1876; application filed July 10, 1876.

*To all whom it may concern:*

Be it known that I, MELCHIOR NOLDEN, of Frankfort-on-the-Main, Empire of Germany, have invented certain new and useful Improvements in Apparatus for Purifying Water; and I do hereby declare that the following is a full, clear, and exact description of the same, reference being had to the accompanying drawing, which forms part of this specification.

This invention relates to apparatus of the same general character as that described in Letters Patent No. 146,940, granted me January 27, 1874, in which the water to be purified is subjected to separate and consecutive cleansing operations, beginning by commingling steam with the water, and afterward subjecting it to the action of suitable chemicals, whereby foreign matters contained in the water are precipitated and collected in the bottom of the apparatus, or separately collected in the purifying-chambers of the apparatus, while the water flows out deprived of its impurities. Such apparatus, on which this invention is an improvement, provides for supplying water to steam-boilers deprived, in a cheap and effective manner, of various injurious substances, mechanically and chemically combined with the water, exhaust or waste steam answering to mingle with the water under treatment, and the apparatus being a continuous-working one.

The invention differs from my former apparatus in certain peculiarities of construction and combinations of parts, including a separate and externally-arranged tank or vessel for heating and depriving the water of certain of its impurities, and for the condensation of the waste steam, which is admitted down into and through the water, that, after being thus heated and purified, passes off by an overflow-pipe to a second and lower tank.

The invention also consists in a certain construction of this second tank, which receives the heated water, with a separate compartment formed in it for the bucket-wheel, which works the chemical device that distributes the chemical agent or agents employed to further purify the water in a tank beneath the hot-water tank.

The invention also includes various simple arrangements and combinations of parts for raising and distributing the chemical precipitating-solutions, and for emptying and cleaning the lower tank or vessel.

Figure 1 represents a front elevation of the apparatus, and Fig. 2 a plan thereof. Fig. 3 is a longitudinal section, and Fig. 4 a further vertical section on the irregular line $x\,x$. Fig. 5 is a side view of a revolving dip tube or tubes, for raising or supplying the chemical solutions.

A is the separated water-heating and steam-condensing tank or vessel. This tank, which may be of any suitable material and shape, is arranged outside of, and placed at a higher elevation than, the tank B, which receives the heated water, but may otherwise occupy any desired relation with the latter. Said tank A is fitted with a cover; a pipe, $b$, which may be controlled by a valve, for supplying the tank with the water to be purified; a pipe, $c$, leading down into the tank, below the surface of the water in the latter, for introducing steam within the body of water in the tank; and an overflow-pipe, $d$, which may be, in part or in whole, of rubber or other flexible material, to prevent transmission to the other tank or tanks of the vibrations consequent upon introducing the steam among the water in the tank A, said overflow-pipe $d$ connecting the detached tank A with the tank B.

The steam may be supplied to the pipe $c$ from any convenient source. Said tank A, having the steam admitted to it within the water to be purified, as described, not only constitutes an effective heater, but provides for a complete separation or precipitation of the sulphate of lime contained in the water, and for purifying the waste steam from greasy matters mixed with it; also provides for the most thorough condensation of the steam.

These advantages are mainly due to the mode of introducing the steam by bringing the water and the steam in direct and intimate contact, and such mode of operation is only practicable when the tank A is a separate one, inasmuch as the vibrations consequent upon the introduction of the steam into the water would render impossible the deposit of the fine particles of chloride of barium or other chemical agent employed in the remaining portion of the apparatus.

The tank B is separated from the tank C eneath it by a partition, e, which has erected pon it a cross-partition, f, forming a separate ompartment, E, within the tank B. This ompartment E serves to contain the bucket-heel G, which has one of its bearings in the artition f, while the other compartment or emaining portion of the tank B forms a receptacle for the heated water entering it by he overflow-pipe d from the tank A.

By this construction the tank B is made to ontain a large body of hot water, which is ontinually exposed to the influence of steam vithout any disturbing vibration. Consequently, I am enabled to obtain a complete recipitation of the carbonate of lime separated by the action of the steam.

The bucket-wheel G, which works the chemical-solution distributer H, that draws up the hemical ingredients or solutions (such as carbonate of soda and chloride of barium) from he pan I of a box or vessel, J, supplying said urifying agents, operates directly and without the intervention of gearing to actuate the hemical-solution distributer H, by the arangement of the latter, which consists of one or more revolving dip-tubes on the axle of the ucket-wheel. This chemical-solution lifter or listributer H conducts the chemical solution lirectly into the hollow nave g on the axle of the bucket-wheel, from whence said solution lrops into a funnel, h, which conveys it to the first compartment in the tank C. The direct connection of the bucket-wheel G with the chemical-solution lifter or distributer also reduces the liability of leakage by dispensing with a stuffing-box, and is generally much simpler than the arrangement described in my patent of January 27, 1874, hereinbefore referred to.

There may be a series of chemical-solution distributers H, if desired, all in communication with each other by hollow naves, so that one funnel, h, will serve to receive all the chemical agents or solutions employed.

The tank C has holes in its bottom, from which pipes k k, furnished with stop cocks or plugs, lead. These pipes serve to clean or empty the lower tank C of deposited matter—such as gypsum, sulphate of lime, chloride of barium. By means of these pipes the tank C, which, as in my former apparatus, is constructed with reversely-arranged upper and lower vertical partitions i, to promote circulation, makes it practicable to clean the tank C without stopping the working of the apparatus.

In the operation of the apparatus, the water to be purified is introduced by the pipe b to the tank A, near its bottom, and steam by the pipe c brought in direct or intimate contact with said water. The water is thus heated to a very high degree, and consequently deposits the carbonate of lime contained in it. The condensed steam will separate all greasy substances, and the different greasy particles will subsequently, in the lower tank C, be saponified by the chemical agents introduced within the said tank, and fall to the bottom of the latter mixed with the heavy sulphate of barium.

The heated water and any non-condensed steam pass through the overflow-pipe d into the largest compartment of the tank B, from whence the water passes by an overflow channel or outlet, s, into the compartment E, and falling on the buckets of the wheel G rotates the latter. From the bottom of this compartment E the water, after having worked the wheel, flows, by a pipe, l, into the lower tank C, near its one end, and passes from thence in a zigzag direction up and down alternately through said tank C to the other end of the latter, from whence it passes off purified by an outlet, m, it having been exposed, during its progress through the tank, to the chemical agent or agents employed to purify it.

Steam forming or accumulating in the tank B passes by a pipe, n, which reaches above the level of the water in said tank, to the rear or end compartment of the tank C, and escapes from thence by a pipe, r, into the outer air.

I claim—

1. In a water-purifying apparatus composed of separate tanks or chambers, in which the water is subjected to separate cleansing operations, the separate tank or vessel A, provided with an inlet for the introduction of the water to be purified, one or more steam-pipes for introducing steam down into and through the water in said tank, and an overflow-pipe for carrying off the heated water from said tank, in combination with a lower tank or receptacle, B, substantially as specified.

2. The hot-water tank or receptacle B, constructed to form a separate or second compartment, E, having an overflow-opening, s, into it, in combination with the wheel G, arranged within the compartment E, and separated from the water in the remaining portion of said tank by a partition, f, essentially as described.

3. The chemical-solution lifter or distributer H, arranged on the axle of the wheel G, by which it is operated, substantially as and for the purposes herein set forth.

4. The circulating lower purifying-tank C, provided with a series of cleansing-apertures in its bottom, and pipes k connected therewith, and having stop cocks or plugs, substantially as and for the purposes herein described.

MELCHIOR NOLDEN.

Witnesses:
PETER MARSHEL,
LOUIS BASSE.